Patented Dec. 3, 1940

2,223,444

UNITED STATES PATENT OFFICE 2,223,444

PRODUCTION OF A SPECIAL BEER WITH A LOW PERCENTAGE OF SUGAR

Hans Distler, Cologne-Lindenthal, Germany, assignor to Paul Josef Winter, Cologne-Lindenthal, Germany No Drawing. Application January 21, 1938, Serial No. 186,083. In Germany January 22, 1937

5 Claims. (Cl. 99—50)

This invention relates to an improved method of producing a special beer with a low percentage of sugar, said beer being particularly intended for persons suffering from diabetes, etc., for whom a beverage rich in carbohydrates is not wholesome.

While normally 40 to 50 g. of carbohydrates or sugar, respectively, are contained in 1 litre of full beer, according to the present invention a beer is obtained having a total sugar content of < 15 g. per litre, for example 6 to 12 g. per litre. Determination of the total sugar content was effected by degrading the higher carbohydrates by treating them with acids and by determining them as glucose.

Heretofore it has been proposed, in producing a special beer poor in sugar or a beer for diabetics, respectively, to employ as fermenting agents, in addition to yeast, micro-organisms such as Schizosaccharomyces pombe which ferment dextrins also. However, the special beers obtained according to that process still contain a considerable total percentage of sugar.

Further it is known during fermentation to add solutions of malt diastases, with a view to rendering the fermentation of the wort as complete as possible.

In contradistinction to the known methods, the process according to the invention avoids both the use of foreign micro-organisms, as running contrary to the beer excise regulations of most countries, and the addition of diastase solutions, the latter necessitating a separate step of manufacture.

According to the invention the diastase from the malt that has been employed originally, is treated so mildly during the entire brewing process that the largest possible amount is preserved for the fermentation and storage operations. In the said operations owing to the quantities of enzymes preserved, a further degradation of the sugars still present in the wort, and, hence, fermentation of these sugars is rendered possible so that a beer very poor in sugar results.

In the first place, preservation of the diastase complex is accomplished by carrying out the boiling of the wort in the brewing house in vacuo and at such a temperature that the enzyme complex present from the malt employed is not broken down.

While normally the wort is boiled in open or closed coppers under atmospheric or slightly increased pressure, according to the invention boiling in vacuo is resorted to, with good circulation taking place although the temperature of 64° to 66° C. is not exceeded. Preferably the hops are added prior to the beginning of the boiling process. It is true that the wort is brought to the boil, but temperatures in excess of those which are essential for the life of the saccharifying enzymes are avoided. As a result a large part of the saccharifying enzymes is still preserved in the finished wort, said enzymes thus being able during the principal and secondary fermentation, to exercise their functions and considerably increase the fermentation of the wort sugar, as compared with normal beers and prior special beers. The after-saccharification, owing to the very large natural quantity of diastase present, is more intense and simpler than by subsequent addition of diastase extracts.

Heretofore, the boiling of the wort, as the last step of the brewing house process, has been regarded as indispensable not only for breaking down the diastase but also for concentrating the wort to get the desired extract strength, destroying bacteria detrimental to the beer, precipitating undesirable proteins, bittering the wort by boiling and leaching of the hops, etc. In fact, it is quite surprising that by the process according to the invention the preservation of the diastase complex is rendered possible while the other aforementioned objects aimed at by the boiling of the wort are attained. Thus, the beverage obtained is guaranteed to possess the characteristic features of beer.

In carrying out the process according to the invention it can be advantageous so to adjust the pH of the wort, for example, by biological acidification that bacteria detrimental to the beer which may be present are prevented from developing both in the wort to be cooled, and during the subsequent fermentation and storage. In order to prevent the development of bacteria detrimental to the beer, sometimes it is preferable to supply the rooms in which the wort coolers are placed with sterilized air. Further, an ample addition of yeast at an early stage is to be recommended under certain circumstances. Effecting the boiling in vacuo does not interfere with the necessary precipitation of the proteins. Owing to the employment of as well dissolved malt and to the state of strong ebullition of the wort during the boiling process, the said precipitation is enhanced.

The bittering of the wort is effected in the same manner as in the normal brewing process, i. e., the hops take part in the boiling operation. To ensure a better yield the hops can be comminuted by known methods, for example, by using a hop separator or a hop-mill. The actual boiling process may be preceded by a digesting and infusing operation with a view to securing the necessary yield of bitter principles. Further, it is possible to make use of a hop extractor or to employ a hop decoction.

It is preferable to combine the boiling of the wort in vacuo with those measures known in the brewing industry which enhance the formation of maltose as compared with the formation of dextrin. For example, a malt prepared accordingly and possessing a high diastatic activity serves as raw material and is treated in the brewing house at a temperature which mainly enhances the formation of maltose. The said temperature is also employed particularly during the finishing of the mashing operation. In contradistinction thereto, in the production of normal beers it has been customary, for the purpose of boiling, to heat the whole or part of the mash, depending on the mashing method adopted, at 100° C. The draining of the wort also is effected at temperatures which will not break down the diastases. In the boiling process there are employed all means or methods which enhance the formation of easily fermentable sugars and which normally are used in the preparation of the wort and help to improve it.

Further, in the manufacture of a special beer with a low percentage of sugar it has proved advantageous to subject not only the wort but also the mash to boiling in vacuo at such a temperature that the diastase enzyme complex originating from the malt employed is not broken down. Hence, heating of the mash at 100° C. is abandoned, and boiling in vacuo at ca. 65° only is effected. By boiling the mash in vacuo a thorough disintegration of the various mash constituents, particularly of the grits, and hence a particularly good yield based on the raw material is obtained. When carrying out the boiling of the mash in vacuo, saccharification of the starch occurs simultaneously with the boiling process, the saccharification temperature coinciding with the boiling temperature in vacuo. Besides, a shortening of the duration of the mashing operation and a saving of the fuel required for the boiling is effected.

Heretofore, it has been proposed to carry out the boiling of the mash in vacuo with a view to causing saccharification to coincide with the boiling. However, from the known methods it could not be inferred that by carrying out the boiling of the mash in vacuo the manufacture of a beer poor in sugar is rendered possible. This could not possibly be deduced from the known method, were it only for the reason that boiling of the mash in vacuo will not at all produce a beer poor in sugar unless the subsequent boiling of the wort also is effected in vacuo.

The following is an example of carrying out the process according to this invention:

The brewing malt to be employed is produced from barley which dissolves very well and has a maximum germinative power, attention being paid to full growth and complete solubility. The kiln-drying of the malt should be carried out with care, the temperature taken within the malt not being allowed to exceed 55° C. The malt thus obtained exhibits extreme diastatic power.

It has proved advantageous to crush this malt as finely as the respective draining device employed will permit. Care should be taken that the husks are well ground up and that the amount of coarse grits contained in the crushed malt is as low as possible.

In brewing house practice the mashing is preferably preceded by a prolonged digestion. This, on the one hand, has been found to furnish particularly satisfactory results and, on the other hand, to secure a good economic yield. The mashing can be carried out, for example, on the so-called infusion system, the optimum temperature of 50° to 52° C. for the conversion of proteins likewise being taken into account accordingly. The bulk of the liquor is preferably adjusted in such a way that the strength of the initial wort, tested by the official saccharometer, does not excess 16%. The water is softened if required. The conversion into sugar takes place at a temperature of 64° to 66° C., the hydrogen ion concentration of the mash being preferably maintained at pH=5.4. Inasmuch as this value is not produced by the acidity of the malt, a suitable biological acidification is employed. This method aims at securing the highest maltose content possible. The conversion into sugar at the temperature mentioned above is carried out till iodine normality is reached. In contradistinction to the customary infusion method, during the finishing of the mashing operation the temperature is not raised above 64° to 66° C. Similarly, the so-called sparging liquor used in the draining operation has a temperature of 64° to 66° C.; if necessary its pH, by means of a biological acidification, is adjusted to 5.4. During the draining the wort in the copper is maintained at 64° to 66° C. till the boiling process begins.

The invention distinctly differs from the usual wort treatment, in order to attain the object in view, viz., the most extensive saccharification and the highest degree of fermentation of the various sugars present. Whereas in the customary boiling processes and boiling operations a definite fixing of the ratio of maltose; dextrins, or of easily fermentable sugars: difficultly fermentable sugars and non-sugars respectively, was aimed at and proved necessary in order to secure a certain type of beer, in the process according to the invention the preservation of the saccharifying diastase enzyme complex is aimed at and accomplished by the selection of the raw materials, the manner of carrying out the mashing operation, and the deliberate omission of the step of raising the temperature to 75° to 78° C. during the finishing of the mashing operation, which otherwise is customary in order to partly fix the sugar ratio. While in the customary brewing house practice the boiling of the wort is effected at boiling temperature under normal atmospheric pressure, or under increased pressure at the respective temperatures, and the definite fixing of the sugar ratio by breaking down the saccharifying enzymes is deliberately aimed at and accomplished, in the process according to the present invention the boiling process is carried out in such a way that, on the one hand, the object of the boiling is attained, barring, the destruction of the enzymes, while, on the other hand, the saccharifying enzymes are preserved for fermentation and storage.

The method according to the invention, whereby the boiling of the mash is effected in vacuo, is illustrated by the following example:

The mashing operation is preferably preceded by a prolonged digestion, particularly good results on the one hand and a good economic yield on the other hand being thus secured. Then the mash is heated at a saccharification temperature of 64° to 65° C. in a vacuum container, the temperatures most favourable for the conversion of proteins, i. e., 50° to 52° C. having previously been taken into account accordingly. Preferably the bulk of the liquor is so adjusted that the strength of the initial wort, tested by the official saccharometer, does not exceed 14 to 16%. The water is softened, if required. Saccharification preferably takes place at a hydrogen ion concentration of the mash of pH=5.4. Inasmuch as this value is not yet produced by the acidity of the malt, a suitable biological acidification is employed. Simultaneously with the saccharification now taking place at 64° to 66° C., boiling of the entire mash is effected under a corresponding vacuum. This boiling process being finished the saccharification temperature is maintained for a short time till iodine normality is reached. Further heating of the said mash to the temperature of 75° to 78° C., otherwise employed during the finishing of the mashing operation, is deliberately abandoned. Iodine normality being reached the mash is instantly pumped into the clarifying tub. The sparging liquor used in the draining preferably has a temperature of 64° to 66° C.; if necessary, its pH value, by means of a biological acidification, is adjusted to 5.4. During the draining operation the wort in the copper is kept at a temperature of 64° to 66° C. till the boiling process begins.

The method of carrying out the fermentation and storage operations depends on whether top or bottom fermentation beer is to be produced.

As an example, the production of a top fermentation beer shall be illustrated as follows:

It is known that top fermentation beer may be produced by adding brewing sugar. It has proved advantageous to adjust a wort of 6%, which has been produced by the aforementioned operations, by means of the necessary amount of brewing sugar to an original wort strength of 11.5% (in the case of full beer) and to pitch the said wort with high-fermenting top fermentation yeast (1 litre per hectolitre). The fermentation temperature amounts to 15° C. In the majority of cases, attenuation when measured by the saccharometer will have reached 0% on the sixth day. In that case, the beer is run into the storecask, and top fermentation secondary yeast (half a litre per hectolitre) is added thereto, the temperature of the cellar during storage being maintained at 10° to 15° C. Then the casks are bunged. When carrying out the new process it has been found that a secondary fermentation of 2 to 3 months will result in the sugar content of the beer being fermented, except 10 g. and less per litre. Hence, an actual degree of fermentation of above 90% can be obtained.

The same effect can be secured, even within a shorter time of storage, when a top fermentation small beer having an original wort strength of 3 to 6.5% is produced. These good results regarding fermentation are doubtless to be attributed both to the preservation of the enzymes in the brewing house operations, and to the additional saccharification during fermentation and storage.

Finally, the production of a bottom fermentation beer by the process according to the invention shall be described hereafter.

After having undergone the above described brewing house operations according to the invention, bottom fermentation beer during principal and secondary fermentation is treated in the following manner: The original gravity, prior to pitching in the fermentation cellar, in the case of strong beer preferably amounts to 11.5%, in the case of small beer to 3 to 6.5%. The pitching temperature preferably amounts to 6° to 7° C., the maximum fermentation temperature to 10° C., as a rule. There is added, per 1 hectolitre of wort, 1 to 1.5 litre of bottom fermentation yeast. Fermentation is effected in a known manner. After the sugar content, when measured by the saccharometer, has reached 0%, the beer is transferred into the store cellar. Bottom fermentation secondary yeast having been added, the casks are stived in the usual manner. The temperature of the store cellar is above the temperature normally maintained.

It will be readily understood that bottom fermentation and storage, owing to the absence of brewing sugar which is added to top fermentation beer, require more time to reach the fermentation effect aimed at as the final object, than in the case of top fermentation beer.

The use of vacuum in the boiling of the wort, apart from preserving the diastase complex, has the additional advantage of saving considerable expenses for steam in the necessary concentrating of the wort. Looked at from this point of view, the use of vacuum during the boiling of the wort is of importance even in the production of normal beers where the boiling of the wort is effected at higher temperatures which will break down the diastases.

What I claim is:

1. A process for the production of beer having a low percentage of sugar which comprises preparing the mash with a diastatic malt, boiling the mash in vacuo at a temperature not exceeding 64° to 66° and thereafter boiling the wort in vacuo at a temperature not exceeding 64° to 66° C., thereby preserving the diastase from the malt, and thereafter carrying out the yeast fermentation in the presence of said diastase.

2. A process according to claim 1 which comprises finishing the mashing operation at a temperature which promotes the formation of maltose.

3. A process for the production of beer having a low percentage of sugar which comprises preparing the mash with a diastatic malt, carrying out the mashing operation at temperatures of about 64° to 66° to preserve the diastase from the malt, acidifying the wort to a point which impedes the development of detrimental bacteria, boiling the wort in vacuo at temperatures of about 64° to 66° to preserve the diastase, and thereafter fermenting the wort in the presence of said diastase.

4. A process according to claim 3 in which the wort is acidified to a point of about 5.4.

5. A process according to claim 1 which comprises hopping the wort with a hop extract.

HANS DISTLER.